United States Patent Office 3,185,669
Patented May 25, 1965

3,185,669
TOTAL LIQUID PHASE ESTERIFICATION
Aubrey R. McKinney, Hammond, Ind., assignor to Standard Oil Company, Chicago, Ill., a corporation of Indiana
No Drawing. Filed Aug. 31, 1959, Ser. No. 836,903
13 Claims. (Cl. 260—75)

This invention relates to the direct esterification of terephthalic acid and mixtures of terephthalic acid containing up to about 35% by weight of isophthalic acid with a diol to provide an ester product which is suitable for conversion to high molecular weight linear polyesters under reduced pressure and elevated temperature. This invention also relates to the preparation of high molecular weight linear condensation polyesters which are capable of being drawn to pliable, strong fibers or into oriented films, or other molded and extruded forms.

Synthetic linear condensation polyesters derived from diols and terephthalic acid, as well as diols and mixtures of terephthalic acid containing up to about 35% by weight isophthalic acid, which are capable of being drawn into pliable, strong fibers or films having oriented crystalline structures are well known. The polyesters have proven to be of considerable commercial value. In general, these polyesters are formed from an ester product of terephthalic acid and mixtures of terephthalic acid containing up to about 35% by weight isophthalic acid and a polyol containing from 2 to 10 carbon atoms. These diols are of the general formula HO—A—OH wherein A may be the linear hydrocarbon chain containing from 2 to 10 methylene groups or A may be a hydrocarbon containing a saturated ring as in the bis-methylol cyclohexanes especially the 1,4 isomer or A may be a hydrocarbon containing a benzene ring as in bismethylol benzenes, α,α'-hydroxy xylenes, especially terephthalyl alcohol. Specific high molecular weight linear polyesters which have attained commercial prominence are polyethylene terephthalate, polyesters derived by co-condensing ethylene glycol derivates of terephthalic and isophthalic acids and polyesters obtained from the bis-methylol cyclohexane esters of isophthalic acid and/or terephthalic acid. In general, the high molecular weight linear polyesters are obtained by the polycondensation or polymerization of what has been sometimes referred to as a monomer ester under reduced pressure and at elevated temperatures. The monomer ester formed contains hydroxy ester groups as in the bis-2-hydroxyethyl terephthalates and isophthalates and the bis (methylol cyclohexyl) terephthalates and isophthalates. The conversion of these hydroxy ester group containing monomers to the high molecular weight linear polyesters under reduced pressure and at elevated temperature is accompanied by splitting out the diol employed to form the ester monomer. The polymerization or polycondensation process has been generally carried out in the presence of a catalyst. The literature is replete with proposed polymerization or polycondensation catalysts. The literature also contains reference to the polycondensation or polymerization of the hydroxy ester group containing monomer in the absence of a catalyst. Although polyesters of suitable high molecular weight can be obtained, they are only obtained after excessively long polycondensation or polymerization reactions which result in a dark-colored product lacking uniform properties. The use of the various polymerization or polycondensation catalysts is said to reduce the time required to produce suitable high molecular weight polyesters of light color and uniform properties.

The art has long been aware that the hydroxy ester group containing monomers can be directly prepared by reacting the diol with terephthalic acid and terephthalic acid containing up to about 35% by weight isophthalic acid. For example, British Patent 578,079 describes the esterification of terephthalic acid with ethylene glycol by refluxing the mixture. However, substantially complete esterification is only accomplished after about 72 hours' reaction time. Commercially, the hydroxy ester group containing monomers are prepared indirectly by a transesterification process involving the reaction of the diol with a dialkyl ester of terephthalic acid or mixtures containing dialkyl esters of terephthalic acid and dialkyl esters of isophthalic acid. In commercial practice dimethyl terephthalate and mixtures thereof with dimethyl isophthalate are employed in the transesterification process. Even here, to avoid excessive reaction conditions and excessively long reaction times transesterification catalysts are employed. Many transesterification catalysts have been proposed and are described in the literature. These transesterification catalysts include litharge, lithium hydride, a combination of lithium hydride and zinc acetate, among many others. Another reason for employing the indirect route to the monomer ester was that terephthalic acid of sufficient high purity was unobtainable per se. To obtain a highly pure form terephthalic acid it was necessary to prepare a readily purifiable form. The lower dialkyl esters, such as dimethyl terephthalate, were found to be suitable derivatives to satisfy the need for a highly pure form of terephthalic acid. These esters can be purified by techniques readily adaptable to commercial practice including recrystallization and fractionation.

Numerous processes for the preparation of the hydroxy ester group containing monomer by direct reaction of terephthalic acid with the diol have been proposed. For example, in British Patent 777,628 it is proposed that the reaction between terephthalic acid and the diol be carried out at superatmospheric pressure and that temperatures above the normal boiling point of the glycol be employed. This patent discloses that as the reaction proceeds the pressure increases due to the formation of water by the esterification reaction and the pressure is reduced periodically by bleeding off a portion of the vapors from the reactor to maintain a predetermined pressure. When such a process is carried out at 230° C. in a stirred autoclave maintained at 35 p.s.i. pressure with a frequent bleed off of pressure to maintain the 35 p.s.i., the reaction between terephthalic acid and ethylene glycol is said to be completed in about 2½ to 3 hours. When the pressure is maintained at 50 p.s.i. by the frequent bleeding off of steam from vapors from the reactor and the pressure is dropped to about 1 atmosphere after 70% esterification is obtained, complete esterification is accomplished in about one hour. Other direct reactions between the diol and terephthalic acid involve the use of large excesses of the diol, more than 20 moles per mole of acid, as well as complicated procedures for separating the useful monomeric diester and monodiol acid ester from reaction products containing low molecular weight polymers some of which contain ether linkages. Still another direct esterification process involves the addition of a small amount of preformed low molecular weight polymer of the diol terephthalate to a mixture of the diol and terephthalic acid and heating this mixture at a temperature above the normal boiling point of the glycol, generally at elevated pressures. Such a process is actually one of autocatalysis wherein the preformed low molecular weight operates as a catalyst. One precaution in the preparation of the high molecular weight linear polyester is to avoid conditions which favor the formation of polymeric material containing ether linkages. One drawback of the autocatalytic process for the direct esterification employing preformed low molecular weight polymer is that this polymer can introduce ether linkages in the final product. The difficulties in the polycondensation or polymerization process arising from ether linkage formation are difficult in and of themselves to overcome without introducing a potential ether linkage contaminant in the preparation of a monomer ester.

Although the process of British Patent 777,628 appears to have solved the direct esterification problem by employing superatmospheric pressure, the readily apparent drawback of bleeding off steam from the vapors to reduce the amount of steam in the gasiform mixture in the reaction vessel is the removal of some of the ethylene glycol which would also be present in the vapors since it has a boiling point of 197–200° C. Furthermore, in spite of the fact that this process has been available for a number of years, it has not been put into commercial practice.

From the foregoing it will be abundantly clear that a commercially adaptable process for the direct esterification of terephthalic acid and mixtures of terephthalic acid with isophthalic acid with the diol hereinbefore defined which will provide the hydroxy ester group containing monomer in a form and purity suitable for the preparation of high molecular weight linear polyesters would be highly desirable.

Such a direct esterification process has now been discovered for reacting terephthalic acid and terephthalic acid containing up to about 35% by weight isophthalic acid with a diol of the formula HO—A—OH wherein A is a divalent hydrocarbon group containing from 2 to 10 carbon atoms and being either an open chain divalent polymethylene group of 2 to 10 carbon atoms or a divalent hydrocarbon group containing a saturated or unsaturated ring as hereinbefore defined. This process involves reacting a mixture containing from 2 to 6 moles of diol, preferably 3 to 5 moles of diol, for each mole of the phthalic acid under superatmospheric pressure in total liquid phase; i.e., under hydraulic pressure and at a temperature above the normal boiling point of the diol, preferably at 200 to 300° C. By normal boiling point of the diol as employed herein is meant the boiling point of the diol at atmospheric pressure. In this process the superatmospheric pressure is maintained throughout the esterification reaction in a pressure regulated system so that all of the reactants are under hydraulic pressure. In other words, all of the diol is in the liquid phase and the reaction mixture completely fills the reaction system. The reaction is continued under these conditions of temperature and pressure until the reaction mixture is a clear fluid wherein at least 50% and even as high as about 85% of the total carboxyl groups of the acid is converted to hydroxyester groups,

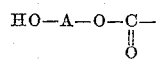

wherein A has the same meaning as hereinbefore designated. It is necessary to carry out this esterification in the absence of oxygen to prevent the oxidation of the diol which would result in the formation of dark-colored ester product and adversely affect the polyester produced therefrom. The direct esterification process of this invention is readily and advantageously adapted to continuous operation.

In the process of this invention high purity terephthalic acid and high purity mixtures of terphthalic acid and isophthalic acid must be employed. By high purity is meant terephthalic acid and/or isophthalic acid having a carboxybenzaldehyde content of 0.5% by weight or below, a DMF color of 10 or below and a TEG color below 200, desirably 150 or lower and preferably 100 or less. The DMF color is determined by comparing against standard APHA colors (Hazen scale) a solution of 5 grams of the acid (terephthalic or isophthalic) in 100 milliliters of dimethyl formamide. The TEG color is determined by combining 4 grams of phthalic acid (terephthalic and/or isophthalic) with 28 millimeters of triethylene glycol by heating at 500° F. in a glass tube in an aluminum block with a purge of nitrogen for about one hour. The tube is removed. The contents are cooled to room temperature in about 30 minutes and diluted 1 to 1 with isopropyl alcohol. The color of the resulting solution is determined by comparison with standard APHA colors (Hazen scale).

Suitable diols of the formula hereinbefore set forth which are useful for the process of this invention include ethylene glycol, 1,3-trimethylene glycol, 1,4-tetramethylene glycol, 1,5-pentamethylene glycol, 1,6-hexamethylene glycol, 1,7-heptamethylene glycol, 1,8-octamethylene glycol, 1,9-nonamethylene glycol, 1,10-decamethylene glycol, cyclohexanedimethylol (1,4 di-hydroxymethyl cyclohexane), p-cyclohexanediol (1,4-quinitol) and terephthalyl alcohol ($\alpha,\alpha'$-dihydroxy-p-xylene) among others. These diols have been previously disclosed as reactants generally with dimethyl terephthalate, isophthalate and/or terephthalyl chloride or isophthalyl chloride to form the corresponding di-(hydroxyalkyl) or di-(methylolphenyl) terephthalates or isophthalates monomers for the polycondensation step to produce high molecular weight linear polyesters from which fibers and films can be produced.

More specifically, the direct esterification process of this invention comprises passing a degassed (air and oxygen-free) mixture of diol and the high purity terephthalic acid in a mole ratio of 2 to 6 moles diol per mole of the phthalic acid, preferably as a uniform slurry of the acid in the diol into an esterification zone containing only a fluid phase under a superatmospheric pressure. The slurry is preferably pumped into the esterification zone but also may be charged to the esterification zone by the pressure of an inert oxygen-free gas such as nitrogen or carbon dioxide. It is essential to this direct esterification that the reactants be heated rapidly to reaction temperature, at least the normal boiling point of the diol. A reaction time of about one hour will provide conversion of about 85% of the total carboxyl groups to hydroxyester groups. The reaction mixture will become a clear fluid when about 50% of the carboxyl groups have been converted to hydroxyester groups. The reaction mixture need not be agitated but may be if desired. The hydroxyester monomer can be withdrawn after the reaction mixture becomes a clear fluid or after the esterification reaches equilibrium under these conditions. Since by-product water is not removed in the direct esterification process of this invention, esterification equilibrium is reached when about 85% of the total carboxyl groups has been converted to hydroxyester groups. In any case, the reaction mixture after becoming a clear fluid can be converted to film and fiber-forming high molecular weight linear polyesters by removing by-product water and unreacted diol therefrom and subjecting the residue to polycondensation conditions in the presence or absence of polycondensation catalysts.

In a batch process a reaction vessel which has been purged with nitrogen or carbon dioxide to remove substantially all of the air is completely filled by charging the degassed slurry of diol and acid under pressure until there is a superatmospheric hydraulic pressure in the vessel. Desirably the hydraulic pressure is above 5 to 10 up to as high as 1000 or more pounds per square inch gauge. The maximum pressure is dependent only on the designed strength of the reaction vessel. In such a batch process there should be a very high ratio of heat transfer surface to volume of reactants to provide rapid heating to reaction temperature. Stirring to aid rapid heat up is also advantageous.

For a continuous direct esterification process employing the hydraulic pressure principle of this invention, the degassed slurry of diol and high purity terephthalic acid to be esterified are forced into a tubular esterification zone filled with the reaction mixture at reaction temperature, preferably at startup filled with the preformed product of direct esterification. At least the portion of the tubular reaction zone to which the degassed reaction mixture is charged should be relatively small in diameter so that the reactants can be rapidly heated by the application of external heating to reaction temperature. The remainder of the tubular esterification zone may be of larger cross-section or the same cross-section as the initial rapid heating zone. After the reactants have been brought to reaction temperature, the heat requirements of the reaction are not as great. As hereinbefore stated, the residence time in such an esterification zone need not be more than about one hour and may be less if an esterification product of less than equilibrium composition is taken. Large tubular reactors can be employed in a continuous process by providing an internal agitator. Such an esterification vessel need not have but may have an initial zone of reduced cross-section for rapid heatup of the reactants. The continuous esterification reaction also can be carried out in a multitude reactor similar in construction to a tube or tube and fin heat-exchanger employed to heat fluids under hydraulic pressure. When single tube esterification reactors are employed, the reactants can be heated to reaction temperature in a heat exchanger before being changed to the esterification tube. This, of course, would eliminate the necessity for an initial zone of reduced cross-section for rapid heatup of the reactants.

The clear fluid mixture resulting from the above direct esterifications can be removed from the esterification zone and cooled to room temperature, preferably cooled in an oxygen free atmosphere, and sold as an intermediate for the preparation of high molecular weight linear polyesters. Most of these products even though containing by-product water and unreacted diol will be low melting solids, melting at 100° C. or below, at room temperature (25 to 30° C.) especially when the esterification is carried to substantial equilibrium as hereinbefore defined for this process. In general, however, polyesters prepared by reheating these esterification products, removing by-product water and unreacted diol and then subjecting to polycondensation conditions may not be as light in color as those prepared by proceeding directly from the hot fluid reaction product. The polyesters, although not white, may only be slightly off white such as a light buff to light straw-color but will be otherwise suitable with respect to melting point and polymeric properties; i.e., molecular weight.

The superatmospheric hydraulic pressures preferred for the process of this invention are in the range of 200 to 300 p.s.i.g. although, as hereinbefore stated, higher or lower pressures can be employed. The above pressure range is preferred because the construction of suitable reaction equipment can be obtained without resorting to unusual design and expensive materials. It is, therefore, a matter of convenience for process apparatus design rather than being critical to the esterification reaction.

To convert the esterification products produced by the process of this invention to fiber and film-forming polyesters, the by-product water and unreacted diol are removed in an oxygen-free atmosphere and the residue converted to polyester generally at a temperature above the melting point of the resulting polyester, usually at 250 to 300° C., and at reduced pressures in the range of 1.0 to 0.1 mm. Hg in an oxygen-free atmosphere. When the product of the direct esterification has been cooled to room temperature, the resulting product is heated to distill off the by-product water and unreacted diol in an oxygen-free atmosphere, nitrogen and carbon dioxide atmospheres are suitable, at a pressure of from atmospheric down to 10 mm. Hg leaving a hydroxyester residue. This residue is then subjected to polycondensation conditions in the presence or absence of a conventional polycondensation catalyst, generally at 0.3 to 0.5 mm. Hg and at 250 to 300° C. in the presence of a nitrogen atmosphere and vigorous mixing. Nitrogen is preferably bubbled through the molten mass to provide a portion of the mixing in addition to mechanical agitation. Vigorous mixing or agitation is required to aid in the removal of the diol split out during polycondensation. The problem here is one of diffusion of a vapor through a fluid which increases in viscosity as the polycondensation reaction proceeds. It is also advantageous to provide the heat required by the polycondensation reaction by heating thin films of the reaction mixture. This may be accomplished by heating falling films, by providing heated baffles and heated agitating blades with only a relatively thin film between the heated baffles and blades, by agitating a film in an externally heated rotating tubular reactor, and the like. Rapid stirring in a pot type reactor heated by electrical elements or by a circulating high boiling fluid in an external jacket or internal coils or both have been employed. Other polycondensation reactors will be hereinafter described.

Where the direct esterification product is not cooled to room temperature and separately recovered, the hot clear fluid may be processed generally in the manner above described. However, since it is at superatmospheric pressure, the hot clear fluid at a temperature above the boiling point of the diol can advantageously be discharged to a lower pressure, say down to 200 to 10 mm. Hg, to flush off the by-product water and unreacted diol. This should also be done in an oxygen-free system as for example with a nitrogen sweep. The hydroxy ester residue is subjected to polycondensation conditions as above described.

As hereinbefore stated, as the polycondensation reaction progresses the viscosity of the fluid polyester increases. This provides a convenient means for following the progress of the polyester formation externally, for external measuring means can be coupled with the agitating means to determine when the desired polyester is formed. From the foregoing it is readily apparent that the esterification process of this invention can be readily made a step of an integrated process for the preparation of fiber and film-forming polyesters. A completely continuous process from esterification through polycondensation will produce fiber and film forming polyesters in 3 to 5 hours while continuous esterification coupled with scheduled batch polycondensation will produce polyesters of equal quality in about the same time.

When the use of polycondensation catalysts is desired, they may be added to the product of direct esterification before or after byproduct water and unreacted diol are removed or they may be added at any time during the polycondensation reaction. Suitable polycondensation catalysts may be selected from the great number suggested in the literature and include among others titanium oxide, titanium tetrafluoride, ferric acetate, litharge, lead oxide, antimony trioxide, organo-tin compounds, organo-manganese halides, and titanium tetralkoxide and ammonium salts thereof.

Depending upon the polyester produced and the purpose, film or fiber manufacture, or other extruded and molded form for which it is to be used, the polyester in addition to being as near white as possible, should be of sufficient high molecular weight to have an intrinsic viscosity of from 0.3 to 1.2 as is reported in the literature. Intrinsic viscosity is an approximation of the molecular weight. It is expressed by the relationship of the viscosity of a dilute solution of the polyester, the viscosity of the solvent (both taken at the same temperature) and the concentration of the polyester in solution. The expression is:

$$[\eta] = \frac{1}{4C}(N_r - 1 + 3 \ln N_r)$$

wherein $$[\eta]$$

is the intrinsic viscosity, $N_r$ is the flow time of a dilute solution of the polyester divided by the flow time of the solvent, both taken at the same temperature, and C is the concentration of the polyester in the dilute solution in grams per 25 milliliters of solution. This expression, the Billmeyer equation, is only accurate when the polymer concentration is between 0.0970 and 0.1030 gram per 25 ml. Acceptable intrinsic viscosities, as reputed in the literature may be in the range of from 0.3 to 1.2 for fiber and film formation. Polyethylene terephthalates for films, in addition to melting at 265.0° C. or above, should have an intrinsic viscosity above 0.5, desirably 0.6 and above and preferably in the range of 0.6 to 0.7. For film preparation, the intrinsic viscosity can be in the range of from 0.3 to 0.6 desirably above 0.4 and preferably 0.4 to 0.5 for polyethylene terephthalate.

The polymer resulting from polycondensation when extruded as ribbons or small rods and cooled quickly is a glass like super-cooled liquid, sometimes referred to as amorphous, which crystallizes on heating to about 100° C. In such a form it is not satisfactory for preparing fibers and film. Usually the ribbon or rod is cut into chips, the chips remelted and either spun into fiber filaments and oriented by drawing, or extruded or cut into sheets and then drawn to orient and heated to stabilize the film. Alternatively, the molten polymer, as produced by this process, can be directly extruded to produce fibers, film or other forms.

The following examples will illustrate the process of this invention both with respect to the direct esterification under superatmospheric hydraulic pressure and to the integrated process through esterification.

*Example I*

In a vessel having a stirrer and dip tube for charging a gas and connected to a source of vacuum there are charged ethylene glycol and high purity terephthalic acid (DMF color 5, TEG color 50 and 4-carboxybenzaldehyde less than 0.1%) in the ratio of 3 moles of glycol per mole of acid (about equal parts by weight of each reactant). The mixture is degassed by alternately sweeping the vessel with nitrogen and evacuating. This mixture is pumped into a closed slurry storage tank having an agitator. A positive nitrogen atmosphere of 1 to 2 p.s.i.g. is maintained in the slurry storage tank. The slurry is pumped into a glass tube esterification reactor having a high heating zone, a reaction zone and a cooling zone from which product is withdrawn. The glass tube is completely filled with liquid reaction medium at 250 p.s.i.g. hydraulic pressure at 260° C. The heating zone and reaction zone together provide a residence time of one hour. The slurry is heated to at least 200° C. in the high heating zone in 3 to 7 minutes. The reaction zone is maintained at 260° C. The cooling zone reduces the temperature of the clear fluid reaction product to about 150° before discharge to a flaker operated in a nitrogen atmosphere. The slurry is continuously fed to the esterification system. As the mixture in the glass tube progresses through about ⅔ to ¾ of the reaction zone it becomes a clear fluid, no suspended terephthalic acid. The cooled product withdrawn, in addition to by-product water and unreacted glycol, contains a hydroxyethyl terephthalate wherein about 85% of the carboxyl groups is hydroxyethyl ester groups. The flaked product is a waxy white crystalline solid melting about 65° C.

To convert the above product to polyethylene terephthalate the white waxy crystalline solid is melted in a closed vessel in a carbon dioxide atmosphere and heated to 190 to 200° C. while the pressure in the vessel is gradually reduced from 760 to 50 mm. Hg to maintain a smooth take off of water and glycol with a slow bleed of carbon dioxide. The residue, hydroxyethyl terephthalates, is pumped into a closed polycondensation kettle having a nitrogen atmosphere. The mixture is stirred vigorously, nitrogen is bubbled therethrough and the mixture is heated to 280° C. at 0.5 mm. Hg. Glycol split out during polycondensation is removed together with some nitrogen which is continuously bubbled into the polyester forming liquid. When the external viscosity measurement indicates that a polyester of suitable intrinsic viscosity has formed, the vacuum source is cut off and the polyester is pumped from the kettle through a nozzle into a water quench bath as a 2 mm. transparent rod. The rod is cut into chips about 2 to 3 mm. long. The chips when heated to about 100 to 110° C. become opaque indicating crystal formation. Polyethylene terephthalate having a melting point of 265° C. and an intrinsic viscosity of 0.6 to 0.7 suitable for fiber spinning may be prepared in this manner in 5 to 7 hours, and a polyester for film manufacture may be prepared in from 3 to 5 hours.

*Example II*

The process of Example I is repeated employing a mole ratio of ethylene glycol to terephthalic acid of 6 to 1. The solidified product is a soft waxy solid melting at 50° C. Polyethylene terephthalate of a light straw color of suitable intrinsic viscosity for fiber or film manufacture may be prepared after removal of the water and unreacted excess glycol. The color of the polyethylene terephthalate is slightly darker than that obtained by the process of Example I and the subsequent polycondensation because of the longer heating to remove the greater excess glycol present.

*Example III*

The process of Example I is repeated except the esterification reactor did not have a cooling zone. The reaction product is continuously flashed to a flash column having a nitrogen atmosphere at about 500 mm. Hg where water and unreacted glycol are removed. The liquid residue is pumped through a preheater to raise its temperature to 260° C. and then is charged to the bottom of a prepolymer column similar to a bubble cap tray fractionating column. Vacuum is applied to the top of the prepolymer column. Prepolymer, corresponding to an intrinsic viscosity of about 0.05 to 0.10, is withdrawn from a top tray and charged to a continuous horizontal polymerizer having heated baffles and a mechanical screw type agitator. The baffles are inclined from the vertical and are in close relationship with the flight of the agitator. This arrangement of baffles and agitator permits exceptionally efficient heat transfer at low temperature differentials, about 15 to 25° C., and heats a relatively thin film. Nitrogen is bubbled through the polymerizing liquid to provide an oxygen-free atmosphere. The continuous polymerizer is operated at 8 to 9 mm. Hg with removal of glycol split out during the polycondensation. An overall residence time in the prepolymer tower and continuous polymerizer of from 2 to 7 hours will provide polyethylene terephthalate suitable for film or fiber manufacture. The polyester can be extruded as 2 mm. rods and chipped as hereinbefore described or can be pumped to a surge tank, held in a nitrogen atmosphere and pumped directly to fiber spinnerettes or film extruders. A white (when crystallized) polyethylene terephthalate may be produced continuously by the above described process.

In the above-described continuous process a polycondensation catalyst may be added to the ester stream as it passes from the flash column to the prepolymer column.

In the above continuous process a number of batch esterification kettles scheduled in their charging and discharging is employed to replace the final continuous polymerizer to permit a substantially continuous charging of the kettles from the prepolymer column. The polymerization is completed at 280° C. and 0.5 mm. Hg obtained by a vacuum source through a glycol condenser. Vigorous agitation aided by bubbling in nitrogen is maintained. Glycol split out is again removed during the final polycondensation. High quality of polyethylene terephthalate for film or fiber manufacture may be produced in this manner at about the same rate per hour as produced employing a continuous final polymerizer. Although the case of batch polymerizers would appear to be disadvantageous when compared to the use of a continuous polymerizer, the latter can present numerous production problems. For example, air leaks into the continuous polymerizer would degrade a considerable amount of polyester. Even after correction of the cause of the air leak, the polymer would for some time be contaminated with off-grade, dark-colored, non-uniform strength polymer. Whereas if one batch is off-grade, it can be discarded without affecting other batches of finished polymer.

During the laboratory experiments it has been observed that during batch polycondensation in small glass tubes, the polyester as it becomes increasingly viscous climbs the agitator and is spun off the agitator blades to the side walls of the tube. The polyester climbs higher and higher as its viscosity increases. The film of polyester on the tube side walls flows down to the reaction mixture. A polycondensation reactor taking advantage of this upward creeping flow of the viscous polyester can be advantageously employed for continuous polyesterification especially following the prepolymer tower. It could be constructed from glass and have its agitator indirectly driven by an externally rotating magnetic field. The agitator shaft then need not extend out of the reactor and thus one major source of air leak, through the agitator seal, could be avoided. A polymer collecting ring is located at the reactor side wall below the top agitator blade of a plurality of agitator blades. The vapor space would be connected to a vacuum source through a glycol condenser. The reactor is heated externally as for example by a heating bath of high boiling liquid. Nitrogen can be fed continuously into the bottom of the reactor with the prepolymer or separately. Prepolymer is continuously charged into the bottom of this reactor where a pressure of 0.2 to 0.5 mm. Hg and a temperature of 280–285° C. is maintained. As the prepolymer is already viscous, it creeps up the agitator, is spun off and is heated as a thin film on the reactor side walls. The polyester creeps higher and higher as its viscosity increases until it reaches the viscosity of the desired polyester. It then flows into the collecting ring from which it is withdrawn, extruded into rods or ribbons from which chips can be prepared or directly extruded into fiber filaments or sheets for orientation. The height of the top agitator blade and consequently the collecting ring will depend upon the polyester being prepared, the desired degree of polycondensation; i.e., molecular weight desired, and the reaction temperature. A blade diameter, tip of one blade to the tip of the opposite blade, of from 0.5 to 0.8 times the diameter of the reactor will be adequate for the design of such a continuous lift type polymerizer. A height above the lower liquid level to the upper blade to provide a residence time of about 2 hours will be satisfactory for the production of polyethylene terephthalate of intrinsic viscosities of from 0.6 to 0.7.

*Example IV*

A mixture of hydroxyethyl esters of terephthalic acid and isophthalic acid suitable for subjecting to polycondensation after removal of water and unreacted glycol to prepare a high molecular weight linear polycoester having an incipient melting point of 229 to 230° C. and an intrinsic viscosity of 0.6 to 0.7 from which a film may be prepared, may be obtained according to the process of this invention in the following manner.

A degassed (air and oxygen free) slurry of equal parts by weight of ethylene glycol and of a mixture of 95% terephthalic acid and 5% isophthalic acid by weight (DMF color 5, TEG color 100 and carboxybenzaldehyde content of less than 0.1%) is charged to an esterification vessel similar to that employed in Example I. The esterification is carried out at 200 p.s.i.g. hydraulic pressure and at 250 to 255° C. for about 0.8 hour. The reaction mixture contains an ester product of about 95% hydroxyethyl terephthalates and about 5% hydroxyethyl isophthalates together with by-product water and unreacted glycol. The conversion of total carboxyl groups to hydroxyethyl ester groups is about 80 to 85%. The solidified reaction product is a waxy white solid.

Preparation of the aforementioned poly-coester is accomplished as with any of the similar hydroxyethyl terephthalate containing direct esterification products after removal of water and unreacted glycol.

*Example V*

The process of Example IV is repeated except a mixture of 65% terephthalic acid and 35% isophthalic acid of the same high purity is employed. A high molecular weight linear poly-coester having an incipient melting point of 153 to 155° C. and an intrinsic viscosity of 0.6 to 0.7 may be prepared from the resulting mixture containing hydroxyethyl esters of terephthalic acid (65%) and isophthalic acid (35%).

By the process of Example I, a reaction product containing 4-hydroxycyclohexyl terephthalates can be prepared from 1,4-quinitol and high purity terephthalic acid, 4-methylcyclohexyl terephthalates can be prepared from 1,4-dimethylol cyclohexane (cis form) and high purity terephthalic acid, and 4-methylolphenyl terephthalates can be prepared from α,α'-dihydroxy-p-xylene and high purity terephthalic acid. Linear polyesters of high molecular weight may be readily prepared from these hydroxyester monomers in the manner hereinbefore described with only minor modifications, taking into account the known nature of these polymers some of which are higher melting than polyethylene terephthalates.

When terephthalic acid and mixtures of terephthalic acid with up to 35% isophthalic acid of substantial lesser purity than hereinbefore defined as high purity are employed in the direct esterification process of this invention, excessively long reaction times are required to obtain an ester product wherein there is substantially no free terephthalic acid. Such an ester product is rather dark in color. Furthermore, polyesters prepared from such low quality esters in the presence of a catalyst are dark in color, lack uniformity when spun into filaments and have melting points below that acceptable for film and fiber preparation.

What is claimed is:

1. A process for the direct esterification of a phthalic acid whose carboxyl groups are separated by at least three ring carbon atoms and said phthalic acid contains at least 65% terephthalic acid and less than 0.1% carboxybenzaldehydes by weight with a diol whose molecule contains 2 to 10 carbon atoms and, other than the two hydroxy groups, contains only carbon and hydrogen atoms, to an ester product suitable for conversion to a drawable film or fiber-forming polyester which comprises completely filling a reaction zone with a degassed, oxygen-free fluid slurry containing as the essential reactant said phthalic acid and said diol in the ratio of from 2 to 12 moles of said diol for each mole of said phthalic acid, reacting said phthalic acid with said diol in said completely fluid filled reaction zone at a temperature of at least the atmospheric pressure boiling point of said diol until at least 50% of the total carboxyl groups of said phthalic acid are converted to hydroxyl ester groups and said fluid slurry becomes a clear fluid product.

2. The process of claim 1 wherein the diol is p-dimethylol benzene.

3. The process of claim 1 wherein the diol is p-dimethylol cyclohexane.

4. The process of claim 1 wherein the slurry of diol and phthalic acid is preheated to reaction temperature and thereafter is pumped into said completely fluid filled reaction zone.

5. The process of claim 1 wherein the slurry of diol and phthalic acid charged to said reaction zone consists essentially of said diol and said phthalic acid in the specified proportions.

6. The process of claim 1 wherein the slurry of diol and phthalic acid charged to said reaction zone consists essentially of said diol and said phthalic acid in the specified proportions and a catalytically effective amount of a transesterification catalyst.

7. A process for the direct esterification of terephthalic acid with ethylene glycol to an ester product suitable for conversions to a drawable film or fiber-forming polyethylene terephthalate which comprises: completely filling a reaction zone with a degassed, substantially oxygen-free fluid slurry containing as the essential reactants terephthalic acid having less than 0.1% 4-carboxybenzaldehyde and ethylene glycol in the mole range of from 2 to 12 moles of ethylene glycol per mole of said terephthalic acid, reacting said terephthalic acid with ethylene glycol in said substantially fluid filled reaction zone at a temperature of at least about 197° C. until at least 50% of the total carboxyl groups of said terephthalic acid are converted to hydroxyethyl ester groups and said reaction mixture is a clear fluid product containing said ester product.

8. The process of claim 7 wherein the slurry charged to the reaction zone consists essentially of 3 to 6 moles of ethylene glycol for each mole of said terephthalic acid, the reaction temperature is in the range of 250° to 270° C. and the pressure is in the range of 7 to 25 atmospheres.

9. The process of claim 7 wherein the slurry charged to the reaction zone consists essentially of 3 to 6 moles of ethylene glycol for each mole of said terephthalic acid and a catalytically effective amount of a transesterification catalyst, the temperature is in the range of 250 to 270° C. and the pressure is in the range of 7 to 25 atmospheres.

10. The process of claim 7 wherein the slurry charged to the reaction zone is preheated and pressurized to the reaction temperature and pressure prior to charging to said reaction zone.

11. A process for the direct esterification of terephthalic acid with ethylene glycol to an ester product suitable for conversion to a drawable film or fiber-forming polyethylene terephthalate which comprises: completely filling a reaction zone with degassed, substantially oxygen-free fluid slurry containing as the essential reactants ethylene glycol and terephthalic acid having less than 0.1% 4-carboxybenzaldehyde in the ratio of from 3 to 6 moles of ethylene glycol per mole of terephthalic acid, reacting said terephthalic acid with ethylene glycol in said completely fluid filled reaction zone at a temperature in the range of 250 to 260° C. and a pressure in the range of 7 to 25 atmospheres until at least about 85% of the total carboxyl groups of said terephthalic acid is converted to hydroxyethyl ester groups and said liquid reaction mixture is a clear fluid product containing said ester product, withdrawing said clear fluid product from said reaction zone, cooling and solidifying said clear fluid product in an inert oxygen-free atmosphere to recover the product of esterification as a solid product.

12. A continuous process for the esterification of terephthalic acid with ethylene glycol to an ester product suitable for conversion to a drawable fiber or film-forming polyethylene terephthalate which comprises: forming a slurry containing 3 to 6 moles of ethylene glycol for each mole of terephthalic acid having less than 0.1% 4-carboxybenzaldehyde, degassing said slurry to remove substantially all oxygen, maintaining said slurry in an inert oxygen-free atmosphere, continuously charging said oxygen-free slurry under pressure to a heated portion of a reaction zone, said reaction zone being completely fluid filled with a liquid reaction mixture comprising said slurry and products of the esterification reaction between said terephthalic acid and ethylene glycol all in the liquid phase at a temperature in the range of from 250° to 270° C. and a pressure in the range of from 7 to 25 atmospheres, maintaining the completely fluid filled reaction zone at said temperature and pressure until 85% of the carboxyl groups of said terephthalic acid has been converted to hydroxyethyl ester groups and this portion of the reaction mixture is a clear fluid product containing said ester product, continuously withdrawing said clear fluid product from said reaction zone at a rate to maintain said reaction zone completely fluid filled, continuously cooling and solidifying said withdrawn clear fluid product in an oxygen-free inert atmosphere to continuously recover the product of esterification as a solid.

13. A continuous process for the preparation of polyethylene terephthalate having an intrinsic viscosity in the range of from 0.5 to 0.7 which comprises: forming a slurry containing 3 to 6 moles of ethylene glycol for each mole of terephthalic acid having less than 0.1% 4-carboxybenzaldehyde, degassing said slurry to remove substantially all oxygen, maintaining said slurry in an inert oxygen-free atmosphere, continuously charging said oxygen-free slurry under pressure to a heated portion of a reaction zone, said reaction zone being completely fluid filled with a liquid reaction mixture comprising said slurry and products of the esterification reaction between said terephthalic acid and ethylene glycol all in the liquid phase at a temperature in the range of from 250° to 270° C. and a pressure in the range of from 7 to 25 atmospheres, maintaining the completely fluid filled reaction zone at said temperature and pressure until about 85% of the carboxyl groups of said terephthalic acid has been converted to hydroxyethyl ester groups and this portion of the reaction mixture is a clear fluid product containing said ester product, continuously withdrawing said clear fluid product from said reaction zone at a rate to maintain said reaction zone completely fluid filled, continuously removing water and excess ethylene glycol from said clear fluid product at a decreasing pressure down to about 2.0 mm. Hg, continuously heating the residue of said clear fluid product in the presence of nitrogen at a temperature in the range of from 275 to 300° C. at a pressure below about 0.5 mm. Hg while continuously removing ethylene glycol split out until the intrinsic viscosity of the resulting polyethylene terephthalate is in the range of from 0.5 to 1.5, and continuously withdrawing said polyethylene terephthalate.

References Cited by the Examiner
UNITED STATES PATENTS

| | | | |
|---|---|---|---|
| 2,465,319 | 3/49 | Whinfield | 260—75 |
| 2,641,592 | 6/53 | Hofrichter | 260—75 |
| 2,855,432 | 10/58 | Binder | 260—475 |
| 2,877,262 | 3/59 | Binder et al. | 260—475 |
| 3,047,621 | 7/62 | Tate | 260—75 |
| 3,050,533 | 8/62 | Munro et al. | 260—75 |

FOREIGN PATENTS

| | | |
|---|---|---|
| 296,787 | 2/30 | Great Britain. |
| 727,790 | 4/55 | Great Britain. |
| 777,628 | 6/57 | Great Britain. |

WILLIAM H. SHORT, *Primary Examiner.*

MILTON STERMAN, LOUISE P. QUAST,
*Examiners.*